United States Patent [19]

Deming

[11] 4,184,179
[45] Jan. 15, 1980

[54] REPRODUCTION OF BINARY SIGNALS FROM A RECORDING MEDIUM THAT MAY BE READ AT VARYING SPEEDS

[75] Inventor: Chandler R. Deming, San Diego, Calif.

[73] Assignee: Cubic Western Data, San Diego, Calif.

[21] Appl. No.: 880,768

[22] Filed: Feb. 24, 1978

[51] Int. Cl.² .............................................. G11B 5/09
[52] U.S. Cl. ...................................... 360/44; 235/463; 360/43
[58] Field of Search ............... 235/440, 449, 466, 463, 235/472, 493; 360/43, 44, 121, 63

[56] References Cited

U.S. PATENT DOCUMENTS

| | | | |
|---|---|---|---|
| 3,603,945 | 9/1971 | Hertrioh | 360/43 |
| 3,766,364 | 10/1973 | Krecioch et al. | 235/463 |
| 3,832,529 | 8/1974 | Nakamura | 235/463 |
| 3,949,193 | 4/1976 | Dowdell | 235/449 |

Primary Examiner—Vincent P. Canney
Attorney, Agent, or Firm—Brown & Martin

[57] ABSTRACT

A system for reproducing a recorded binary signal from a recording medium that may be read at varying speeds is disclosed. The recording medium in a magnetic recording medium in which the binary signal was recorded by effecting predetermined alternating flux changes in the recording medium, and in which the distance of separation between consecutively effected predetermined flux changes does not exceed a first predetermined distance and is not less than a second predetermined distance. The system includes a device for receiving the recording medium; a leading read head and amplifier circuit for sensing the predetermined changes in the received recording medium; a trailing read head and amplifier circuit for sensing the predetermined changes in the received recording medium, wherein the trailing read head is separated from the leading read head to sense the flux changes after the leading read head, and the distance of separation between the trailing and leading read heads is less than the first predetermined distance and more than the second predetermined distance; and a logic circuit that is responsive to the predetermined flux changes in the recording medium being sensed by the leading and trailing read heads for reproducing the recorded binary signal. The system is particularly useful for reproducing binary signals in response to flux changes that are read from the recording medium at speeds that may vary from 2 to 200 inches per second. Systems for reproducing pulse width modulated and F2F recorded binary signals are disclosed.

16 Claims, 7 Drawing Figures

REPRODUCTION OF BINARY SIGNALS FROM A RECORDING MEDIUM THAT MAY BE READ AT VARYING SPEEDS

BACKGROUND OF THE INVENTION

The present invention generally pertains to the reproduction of binary signals from a recording medium and is particularly directed to a system for reproducing such signals when they are read from the recording medium at varying speeds.

A magnetic recording medium is commonly used for recording binary signals. The signals are recorded by effecting alternating flux changes in the recording medium. In accordance with the particular binary coding scheme being employed, the distance of separation between consecutively effected flux changes typically is either a first predetermined distance or a second predetermined distance. Two popular binary coding schemes are pulse width modulation and F2F.

In accordance with the pulse width modulated binary coding scheme, a flux change in one direction (to wit: South-to-North) represents a clock pulse and a flux change in the opposite direction (North-to-South) represents a data pulse. The distance of separation between the South-to-North flux changes representing clock pulses is constant and the distance of separation from the South-to-North flux changes (representing clock pulses) to the North-to-South flux changes (representing data pulses) is either a first predetermined distance to represent one binary state or a second predetermined distance that is less than the first predetermined distance to represent the opposite binary state.

In accordance with the F2F binary coding scheme, one binary state is represented by two consecutive flux changes that are separated by a first predetermined distance, and the opposite binary state is represented by three consecutive flux changes that are separated by a second predetermined distance that is approximately half the first predetermined distance.

To reproduce the recorded binary signal the recording medium is moved in relation to a read head which senses the flux changes in the recording medium and produces an electrical signal which is amplified and provided to a signal processing circuit. The recording medium is moved past the read head at a relatively constant speed such that the duration between the signals produced by the read head that are received by the signal processing circuit represent the distances between the flux changes in the recording medium, thereby enabling the recorded binary signal to be reproduced in accordance with the binary coding scheme employed for recording.

In some applications, however, this system for reproducing recorded binary signals is not satisfactory. For example, binary signals are frequently recorded in magnetic recording medium strips affixed to plastic cards, such as credit cards and bank cards. When these cards are transported past a read head at a relatively constant speed they can be read satisfactorily. However, mechanisms for transporting the recording medium past the read head at a constant speed add to the cost of a device to be used by merchants and others for reading binary data from such cards. And, although the flux changes can be sensed by moving the card past a read head by hand, the variation in the speed of such hand movement makes it impossible to consistently reproduce the recorded binary signal accurately with conventional binary signal reproducing systems.

Therefore it is an object of the present invention to provide a system for reproducing binary signals from a recording medium wherein the recording medium may be read at varying speeds as well as at constant speeds.

SUMMARY OF THE INVENTION

The present invention is a system for reproducing a recorded binary signal from a recording medium in which the signal was recorded by effecting predetermined changes in the state of a given characteristic of the recording medium, such as a flux change in a magnetic recording medium, and the distance of separation between consecutively effect predetermined changes does not exceed a first predetermined distance and is not less than a second predetermined distance. This system includes a device for receiving the recording medium; a leading sensor, such as a read head, for sensing the predetermined changes in the received recording medium; a trailing sensor such as a read head, for sensing the predetermined changes in the received recording medium, wherein the trailing sensor is separated from the leading sensor to sense the changes after the leading sensor and the distance of separation between the trailing and leading sensors is less than the first predetermined distance and more than the second predetermined distance; and a logic circuit that is responsive to the predetermined changes in the recording medium being sensed by the leading and trailing sensors for reproducing the binary signal. This system has the capability of reproducing binary signals from a recording medium notwithstanding whether the recording medium is moved in relation to the sensors at a constant speed or at varying speed.

The preferred embodiments of the present invention disclosed herein are designed for reproducing either pulse width modulated or F2F binary signals from a magnetic recording medium.

The present invention is applicable for use with recording media wherein the given characteristic is other than the magnetic property of the medium, such as, but not restricted to, the light transmissivety or the electrostatic property of the medium.

Additional features of the present invention, particularly the logic circuits for reproducing the binary signals from the different types of binary coded signals are discussed in the description of the preferred embodiments.

DESCRIPTION OF THE PREFERRED EMBODIMENTS

Figure 1:
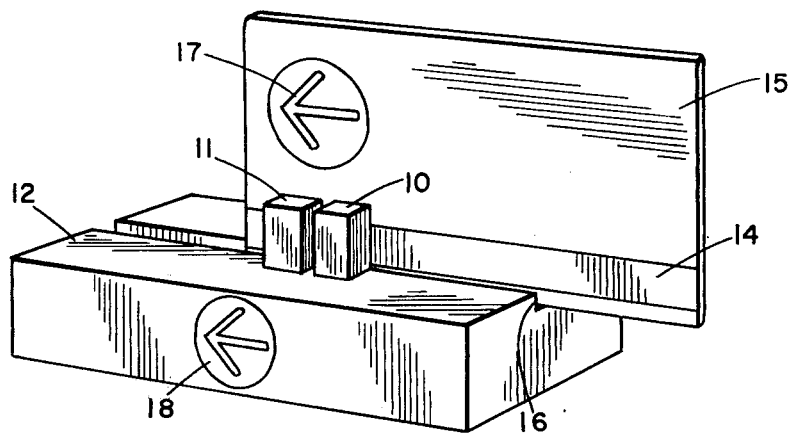
FIG. 1 is a perspective view of a device for use in the system of the present invention for reading recorded flux changes from a received magnetic recording medium.
Figure 4:
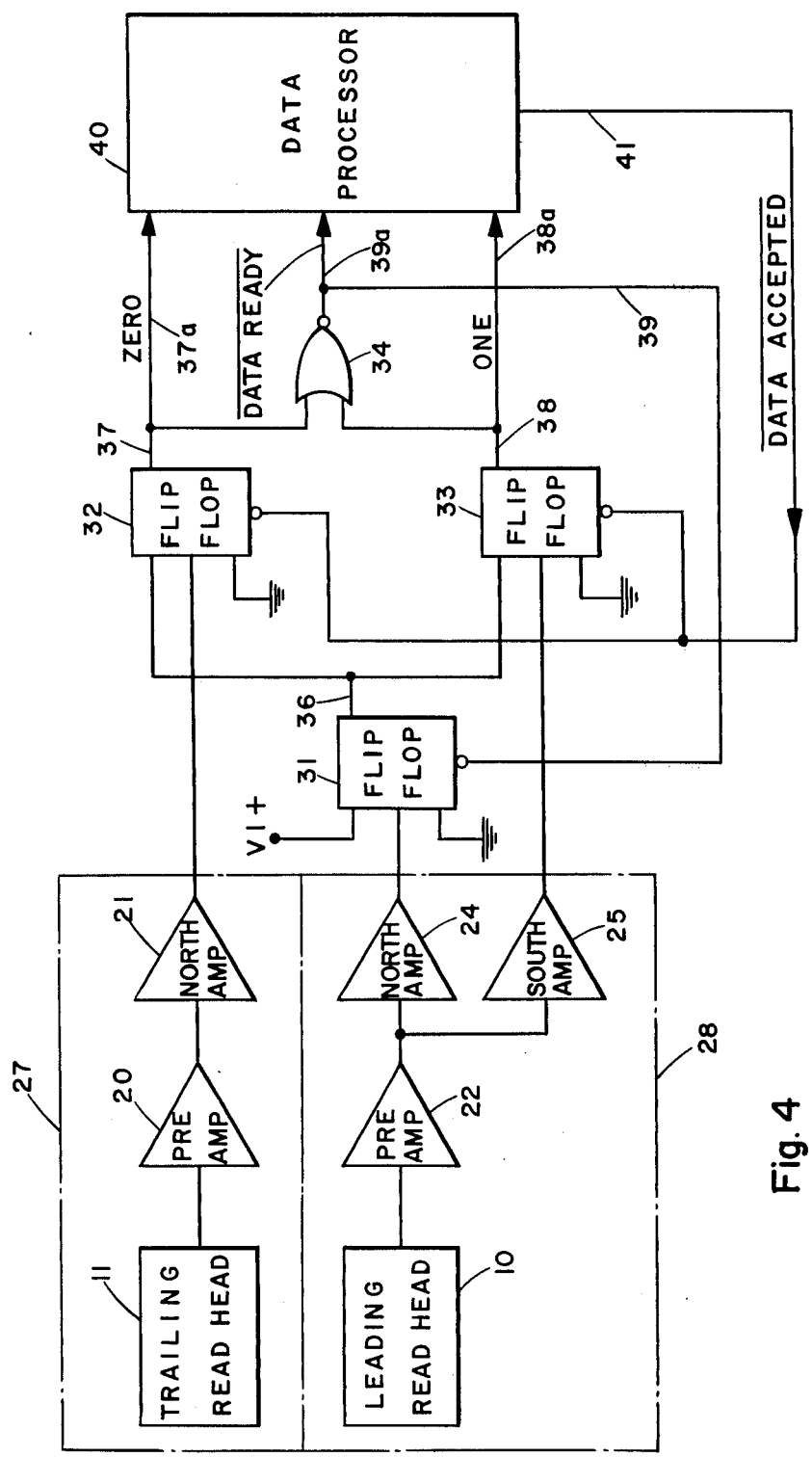
FIG. 4 is a schematic combined block and circuit diagram of the system of the present invention for reproducing pulse width modulated binary signals.
Figure 6:
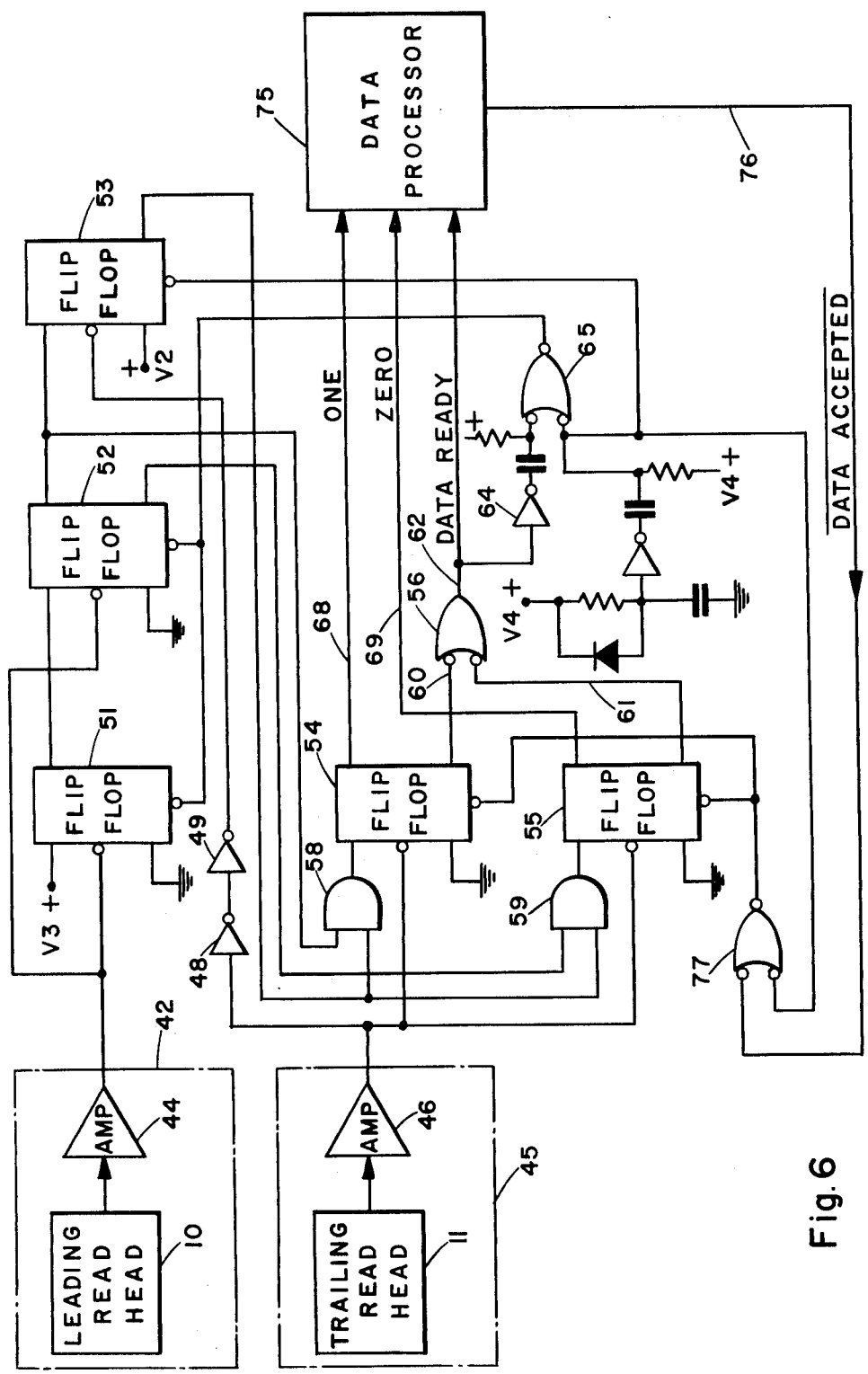
FIG. 6 is a schematic combined block and circuit diagram of the system of the present invention for reproducing F2F binary signals.

Referring to FIG. 1, a leading read head 10 and a trailing read head 11 are positioned on a device 12 for receiving a recording medium 14. A magnetic recording medium 14 is affixed to a plastic card 15. The card 15 is received within slot 16 of the device 12 such that when the card 15 is moved past the read heads 10 and 11 in the direction shown by the arrows 17 on the card 15 and 18 on the device 12, the leading read head 10 senses flux changes in the magnetic recording medium 14 before such flux changes are sensed by the trailing read head 11. The read heads are connected to signal amplifiers and a logic circuit as shown in FIGS. 4 and 6 illustrating two different preferred embodiments of the system of the present invention.

Figure 2:
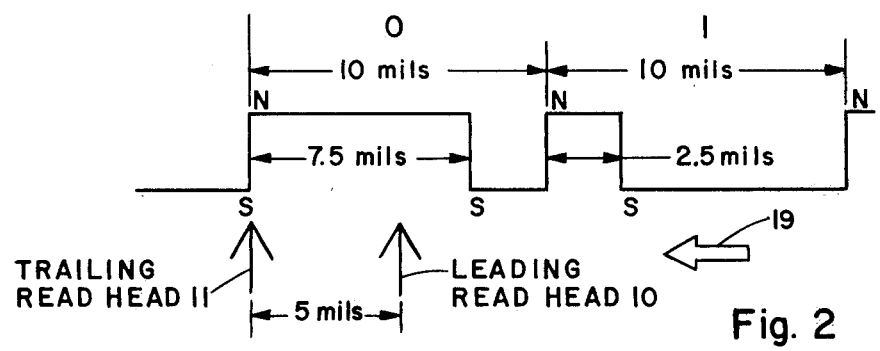
FIG. 2 illustrates the spacing of the leading and trailing read heads in relation to the positions of the flux changes on a recording medium having a binary signal recorded in accordance with a pulse width modulation coding scheme.
Figure 3:
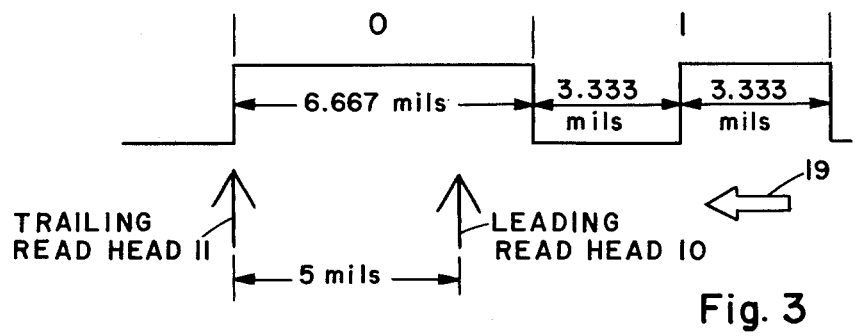
FIG. 3 illustrates the spacing of leading and trailing read heads in relation to the positions of the flux changes on a recording medium having binary signals recorded in accordance with a F2F recording scheme.

The distance of separation between the two read heads 10 and 11 is determined in accordance with the density of the flux changes in the recording medium 14. FIGS. 2 and 3 illustrate the distance of separation of the read heads 10 and 11 as determined in accordance with the distance of separation of the flux changes for a pulse width modulated binary signal recording and an F2F binary signal recording respectively.

In the example of the pulse width modulated binary signal recording shown in FIG. 2, flux changes from South-to-North represent clock pulses, and flux changes from North-to-South represent data pulses.

The distance of separation between the South-to-North flux changes is always approximately 10 mils, whereas the distance of separation from the South-to-North flux changes to the North-to-South flux changes is either approximately 7.5 mils to represent a binary "0", or approximately 2.5 mils to represent a binary "1".

The trailing read head 11 is separated from the leading read head 10 to sense the flux changes after the leading read head 10 when a recording medium containing such flux changes is moved past the read heads 10 and 11 in the direction of the arrow 19. The distance of separation between the trailing and leading read heads is approximately 5 mils.

In the example of the F2F binary signal recording shown, wherein a binary "0" is represented by two consecutive flux changes that are separated by approximately 6.667 mils, and a binary "1" is represented by three consecutive flux changes that are separated by approximately 3.333 mils.

The trailing read head 11 is separated from the leading read head 10 to sense the flux changes after the leading read head 10 when a recording medium containing such flux changes is moved past the read heads 10 and 11 in the direction of the arrow 19. The distance of separation between the trailing and leading read heads is approximately 5 mils. Although two separate read heads 10, 11 are shown in the Drawing, the system of the present invention may alternatively include two separate gaps in a single read head, wherein the spacing of the gaps is equivalent to the spacing of the heads 10 and 11.

Figure 5:
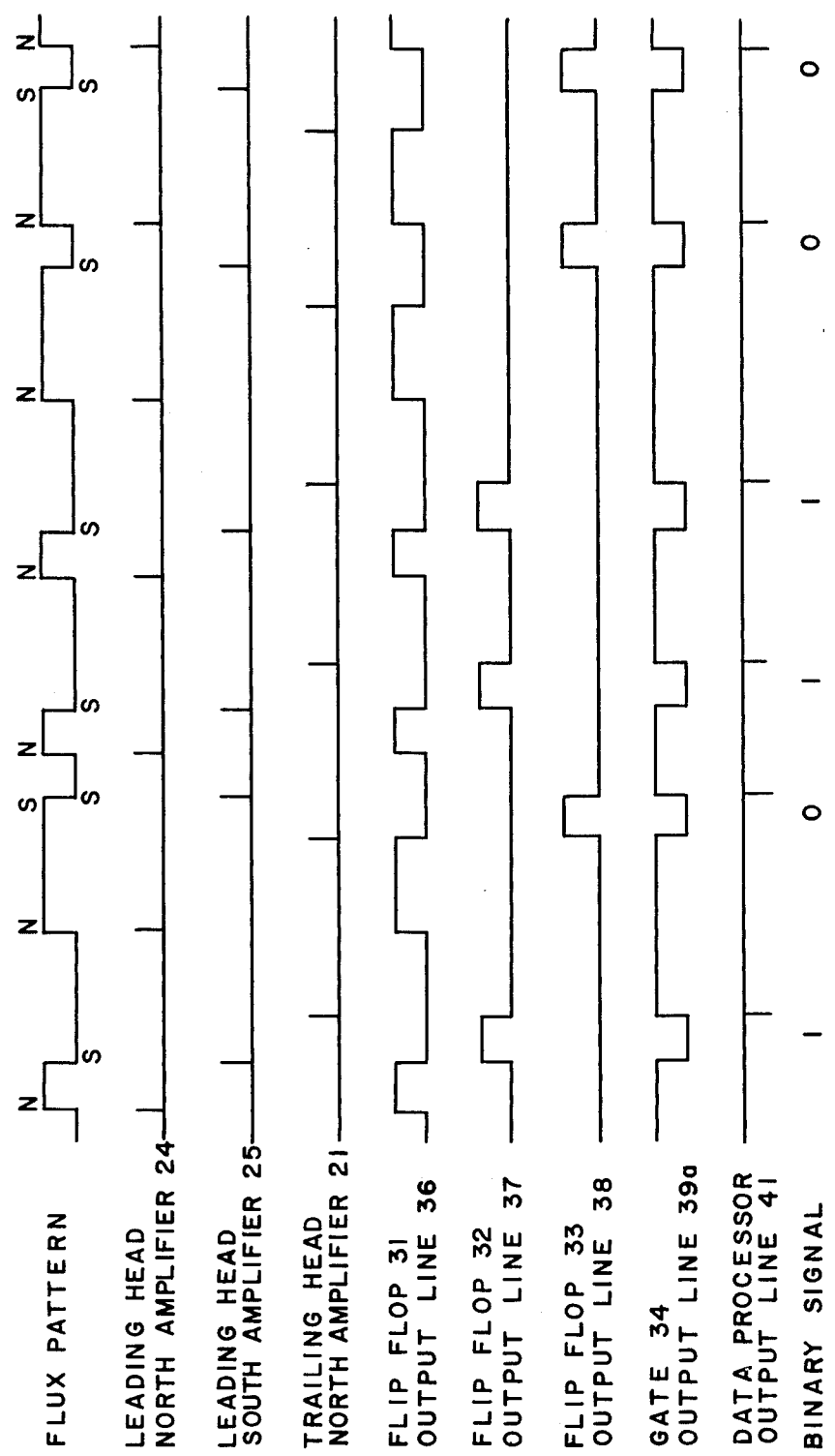
FIG. 5 illustrates the waveforms of a flux pattern in a pulse width modulated recorded magnetic recording medium, and of the resultant signals produced in the system of FIG. 4 upon sensing such flux changes.

FIG. 4 shows a logic circuit that is responsive to the flux changes in the recording medium 14 being sensed by the leading and trailing read heads 10 and 11 for reproducing a pulse width modulated binary signal. In accordance with the terminology used herein, the term "sensor" as used for sensing a given state change includes not only a read head but also any amplifiers that are connected to the read head for enabling the given state change to be sensed from a received recording medium scanned by the read head. For example in FIG. 4, the trailing sensor 27 includes not only the trailing read head 11, but also a preamplifier 20 and a North amplifier 21 for providing an output pulse when a South-to-North flux change is sensed from a received magnetic recording medium scanned by the read head 11. See FIG. 5. Likewise, the leading sensor 28 includes not only the leading read head 10, but also a preamplifier 22 and a North amplifier 24 for providing an output pulse when a South-to-North flux change is sensed, and a South amplifer 25 for providing an output pulse when a North-to-South flux change is sensed from a received magnetic recording medium scanned by the read head 10. See FIG. 5.

The logic circuit of FIG. 4 includes a first flip-flop 31, a second flip-flop 32, a third flip-flop 33 and a gate 34. The flip-flop 31, 32 and 33 are JK flip-flops.

The first flip-flop 31 has its J input terminal connected to a positive voltage source V1 so as to be continuously enabled; and has its clock input terminal coupled to the North amplifier 24 of the leading sensor 28 for being clocked in response to South-to-North flux change being sensed by the leading read head 10. See FIG. 5. The K input terminal of the flip-flop 31 is connected to circuit ground potential so that once the output signal on line 36 from the flip-flop 31 is changed in response to the flip-flop 31 being clocked it will remain the same until the flip-flop 31 is reset.

The second flip-flop 32 has it J input terminal coupled to the Q output terminal of the first flip-flop 31 via line 36 for being enabled in response to the first flip-flop 31 being clocked; and has its clock terminal coupled to the North amplifier 21 of the trailing sensor 27 for being clocked in response to a South-to-North flux change subsequently being sensed by the trailing read head 11. See FIG. 5. The K input terminal of the flip-flop 32 is connected to circuit ground potential so that once the output signal on line 37 from the flip-flop 32 is changed in response to the flip-flop 32 being clocked it will remain the same until the flip-flop 32 is reset.

The third flip-flop 33 has its J input terminal coupled to the Q output terminal of the first flip-flop 31 via line 36 for being enabled in response to the first flip-flop 31 being clocked; and has its clock terminal coupled to the South amplifier 25 of the leading sensor 28 for being clocked in response to a North-to-South flux change subsequently being sensed by the leading read head 10. The K input terminal of the flip-flop 33 is connected to circuit ground potential so that once the output signal on line 38 from the flip-flop 33 is changed in response to the flip-flop 33 being clocked it will remain the same until the flip-flop 33 is reset.

The gate 34 is a NOR gate having its two input terminals coupled to the Q output of the second and third flip-flop 32, 33 via lines 37 and 38 respectively for providing a signal on line 39 to the reset input terminal of the flip-flop 31 for resetting the first flip-flop 31 in response to either of the second and third flip-flops 32, 33 being enabled and subsequently clocked. See FIG. 5.

A first output signal is provided on line 37a from the Q output of the second flip-flop 32 to represent the binary "zero" when, following the leading read head 10 sensing the first South-to-North flux change occurring while the second and third flip-flops 32, 33 are not enabled, the trailing read head 11 senses a South-to-North flux change before the leading read head 10 senses a North-to-South flux change. See FIG. 5.

A second output signal is provided on line 38a from the Q output of the third flip-flop 33 to represent a binary "one" when, following the leading read head 10 sensing the first South-to-North flux change occurring while the second and third flip-flops 32, 33 are not enabled the leading read head 10 senses a North-to-South flux change before the trailing read head 11 senses a South-to-North flux change. See FIG. 5.

Accordingly the first flip-flop 31 is reset by the signal on line 39 from the NOR gate 34 whenever either a first output signal indicating a binary zero is provided on line 37a or a second output signal indicating a binary one is provided on line 38a.

A data processor 40 is coupled to the Q outputs of the second and third flip-flops 32, 33 for receiving the first and second output signals on line 37a and 38a respectively.

A "data ready" signal is provided on line 39a from the gate 34 to the data processor 40 whenever either a first output signal indicating a binary zero is provided on line 37a or a second output signal indicating a binary one is provided on line 38a.

The data processor 40 is coupled to the Q output terminal of either the second or the third flip-flop 32, 33 for detecting the signal state at the coupled Q output terminal upon receipt of the data ready signal on line 39a, and for providing a data accepted signal on line 41 to the reset input terminals of the second and third flip-flops 32, 33 to reset both the second and third flip-flops 32, 33 following detection of the signal state at the coupled Q output terminal.

The data accepted signal on line 41 must occur before the next output pulse provided by the North amplifier 24 in response to the leading read head sensing the next South-to-North flux change.

The system of FIG. 4 is capable of reproducing a pulse with modulated binary signal in response to flux changes that are read from a recording medium wherein the spacing between flux changes is as shown in FIG. 2 at speeds that may vary from 2 to 200 inches per second.

The logic circuit that is responsive to the flux changes in the recording medium 14 being sensed by the leading and trailing read heads for reproducing a F2F binary signal is shown in FIG. 6. In the system shown in FIG. 6, the leading sensor 42 includes the leading read head 10 and an amplifier 44; and the trailing sensor includes the trailing read head 11 and an amplifier 46.

The amplifier 44 provides an output pulse when the leading read head 10 senses a flux change in a received magnetic recording medium; and the amplifier 46 provides an output pulse when the trailing read head 11 senses a flux change in a received magnetic recording medium. See FIG. 7.

The logic circuit of FIG. 6 essentially includes a first flip-flop 51, a second flip-flop 52, a third flip-flop 53, a fourth flip-flop 54, a fifth flip-flop 55, and an OR gate 56. All of the five flip-flops 51, 52, 53, 54, 55 are JK flip-flops.

The first flip-flop 51 has its J input terminal connected to a positive voltage source V3 so as to be continuously enabled; and has it clock input terminal coupled to the amplifier 44 of the leading sensor 42 for being clocked in response to a flux change being sensed by the leading read head 10. The flip-flop 51 has its K input terminal connected to circuit ground potential so that once the output signal from the Q output terminal of the flip-flop 51 is changed in response to the flip-flop 51 being clocked it will remain the same until the flip-flop 51 is reset.

The second flip-flop 52 has its J input terminal coupled to the Q output terminal first flip-flop 51 for being enabled in response to the first flip-flop 51 being clocked; and has its clock input terminal coupled to the amplifier 44 of the leading sensor 42 for being clocked in response to a flux change subsequently being sensed by the leading read head 10. See FIG. 7. The flip-flop 52 has its K input terminal connected to circuit ground potential so that once the output signal from the Q output terminal of the flip-flop 52 is changed in response to the flip-flop 52 being clocked it will remain the same until the flip-flop 52 is reset.

The third flip-flop 53 has its J input terminal coupled to the Q output terminal of the second flip-flop 52 for being enabled in response to the second flip-flop 52 being enabled and subsequently clocked; and has its clock input terminal coupled to the amplifier 46 of the trailing sensor 45 for being toggled in response to flux changes that are subsequently being sensed by the trailing read head 11. See FIG. 7. The K input terminal of the flip-flop 53 is connected to a source of positive voltage potential V2, so that the flip-flop 54 can be toggled by successive pulses received at its clock input terminal. The output signal from the amplifier 46 to the clock input terminal of the third flip-flop 53 is slightly delayed by a pair of inverters 48 and 49.

The fourth flip-flop 54 has its J input terminal coupled through an AND gate 58 to the Q output terminal of the second flip-flop 52 and to $\overline{Q}$ output terminal of the third flip-flop 53 for being enabled in response to the second flip-flop 52 being enabled and subsequently clocked and the third flip-flop 53 being either untoggled or toggled twice after being enabled. The fourth flip-flop 54 has its clock input terminal coupled to the amplifier 46 of the trailing sensor 45 for being clocked in response to a flux change subsequently being sensed by the trailing read head 11. See FIG. 7. The flip-flop 54 has its K input terminal connected to circuit ground potential so that once the output signal from the Q output terminal of the flip-flop 54 is changed in response to the flip-flop 54 being clocked it will remain the same until the flip-flop 54 is reset.

The fifth flip-flop 55 has its J input coupled through an AND gate 59 to the $\overline{Q}$ output terminals of the second and third flip-flops 52, 53 for being enabled when the third flip-flop 53 is not enabled, except when the third flip-flop 53 has been toggled only once after being enabled. The fifth flip-flop 55 has its clock input terminal coupled to the amplifier 46 of the trailing sensor 45 for being clocked in response to a flux change subsequently being sensed by the trailing read head 11. See FIG. 7. The flip-flop 55 has its K input terminal connected to circuit ground potential so that once the output signal from the Q output terminal of the flip-flop 55 is changed in response to the flip-flop 55 being clocked it will remain the same until the flip-flop 55 is reset.

The gate 56 is an OR gate having its two input terminals coupled to the Q output terminals of the fourth and fifth flip-flops 54, 55 via lines 60 and 61 respectively for providing a signal on line 62 to the reset terminals of the first and second flip-flops 51, 52 via an inverter 64 and a NOR gate 65 to reset the first and second flip-flops 51, 52 in response to either of the fourth and fifth flip-flops 54, 55 being enabled and subsequently clocked. See FIG. 7.

The inverter 64 and the NOR gate 65 slightly delay the resetting of the first and second flip-flops 51, 52. One input terminal of the NOR gate 65 is AC coupled to the output of the OR gate 56 via the inverter 64; and the input terminal of the NOR gate 65 is coupled to a source of positive voltage potential V4. The reset input terminal of the third flip-flop 53 also is coupled to the source of positive voltage potential V4.

Figure 7:
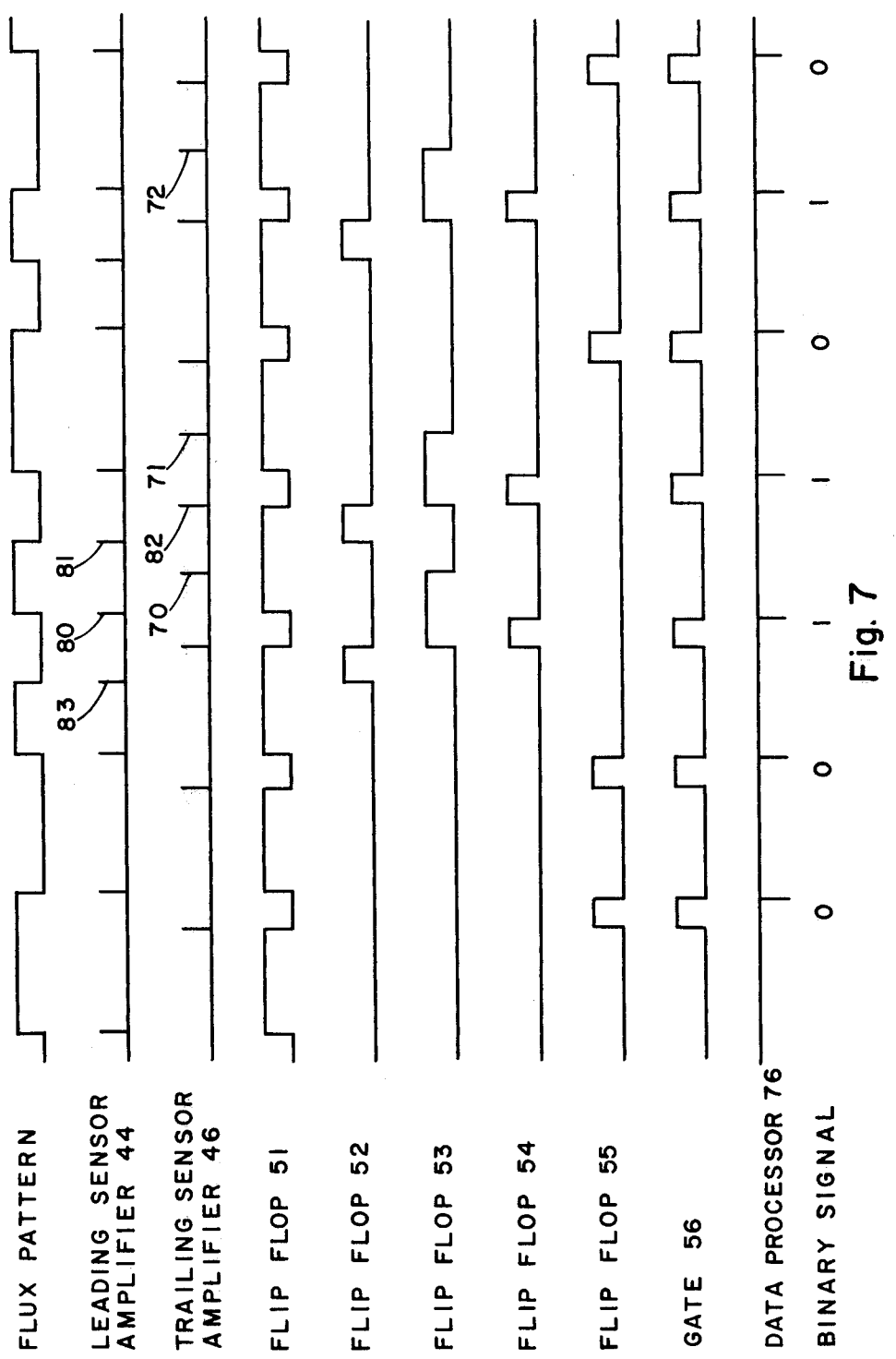
FIG. 7 illustrates the waveforms of a flux pattern in an F2F recorded magnetic recording medium, and of the resultant signals produced in the system of FIG. 6 upon sensing such flux changes.

A first output signal representing a binary "one" is provided on line 68 from the Q output of the fourth flip-flop 54 output when, following the leading read head 10 sensing the first flux change 80 occurring while the second and third flip-flops 52, 53 are not enabled, the leading read head 10 senses another flux change 81 prior to the trailing read head 11 sensing a flux change 82 other than the second flux change 70 sensed by the trailing read head 11 following said another flux change 83 previously sensed by the leading read head 10 before the first flip-flop 51 was reset. See FIG. 7. Said "second flux change sensed by the trailing read head 11" results in the output signals pulses 70, 71 and 72 provided from the trailing sensor amplifier 46, as shown in FIG. 7. It is important that such the pulses 70, 71, 72 resulting from such "second flux changes" be ignored to avoid erroneous binary signal reproduction by the logic circuit of FIG. 6.

A second output signal representing a binary "zero" is provided on line 69 from the Q output of the fifth flip-flop 55 when, following the leading read head 10 sensing the first flux change occurring while the second and third flip-flops 52, 53 are not enabled, and prior to the leading read head 10 sensing another flux change, the trailing read head 11 senses a flux change other than the second flux change sensed by the trailing read head 11 following said another flux change previously sensed by the leading read head 10 before the first flip-flop 51 was reset. See FIG. 7.

The first and second flip-flops 51, 52 are both reset by the signal on line 62 from the OR gate 56 whenever either a first output signal is provided on line 68 or a second output signal is provided on line 69.

The system of FIG. 6 further includes a data processor 75, which is coupled to the Q outputs of the fourth and fifth flip-flops 54, 55 for receiving the first and second output signals on lines 68 and 69 respectively.

A data ready signal is provided on line 62 from the OR gate 56 to the data processor 75 whenever a first output signal indicating a binary one is provided on line 68 or a second output signal indicating a binary zero is provided on line 69.

The data processor 75 is coupled to the Q output terminal of either the fourth or the fifth flip-flop 54, 55 for detecting the signal state at the coupled Q output terminal upon receipt of the data ready signal on line 56 and for providing a data accepted signal on line 76 to the reset input terminals of the fourth and fifth flip-flops via NOR gate 77 to reset the fourth and fifth flip-flops 54, 55 following detection of the signal state at the coupled Q output terminal. The NOR gate 77 has a second input terminal that is coupled to the positive voltage source V4.

The data accepted signal on line 76 must occur before the occurrence of the next flux change sensed by the trailing read head 11 following the receipt of the signals on lines 62, 68 and/or 69 by the data processor 75 other than the "second flux change sensed by the trailing read head 11" which causes the amplifier 46 to produce pulses such as 70, 71 and 72.

The system of FIG. 6 is capable of reproducing a F2F binary signal in response to flux changes that are read from a recording medium wherein the spacing between flux changes is as shown in FIG. 3 at speeds that may vary from 2 to 200 inches per second.

I claim:

1. A system for reproducing a recorded pulse width modulated binary information signal from a magnetic recording medium in which the signal was recorded by effecting alternating predetermined flux changes in the recording medium, with a flux change in one direction representing a clock pulse and a flux change in the opposite direction representing a data pulse, wherein the distance of separation between the flux changes in one direction is constant and the distance of separation from the flux changes in the one direction to the flux changes in the opposite direction is either a first predetermined distance to represent one binary state or a second predetermined distance that is less than the first predetermined distance to represent the opposite binary state, comprising means for receiving a said recording medium;

a leading sensor for sensing the flux changes in both directions in the received recording medium;

a trailing sensor for sensing the flux changes in the one direction in the received recording medium, wherein the trailing sensor is separated from the leading sensor to sense said flux changes after the leading sensor and the distance of separation between the trailing and leading sensors is less than said first predetermined distance and more than said second predetermined distance; and a logic circuit that is responsive to the flux changes in the recording medium being sensed by the leading and trailing sensor for reproducing said binary information signal, wherein the logic circuit comprises a first flip-flop connected to be continuously enabled and coupled to the leading sensor for being clocked in response to a said flux change in the one direction being sensed by the leading sensor;

a second flip-flop coupled to the first flip-flop for being enabled in response to the first flip-flop being clocked, and coupled to the trailing sensor for being clocked in response to a said flux change in the one direction subsequently being sensed by the tailing sensor;

a third flip-flop coupled to the first flip-flop for being enabled in response to the first flip-flop being clocked, and coupled to the leading sensor for being clocked in response to a said flux change in the opposite direction subsequently being sensed by the leading sensor; and a gate coupled to the second and third flip-flop outputs for resetting the first flip-flop in response to either of the second and third flip-flops being enabled and subsequently clocked;

wherein a first output signal is provided from the second flip-flop output to represent the one binary state when following the leading sensor sensing the first flux change in the one direction occurring while the second and third flip-flops are not enabled, the trailing sensor senses a flux change in the one direction before the leading sensor senses a flux change in the opposite direction; and a second output signal is provided from the third flip-flop to represent the opposite binary state when following the leading sensor sensing the first flux change in the one direction occurring while the second and third flip-flops are not enabled the leading sensor senses a flux change in the opposite direction before the trailing sensor senses a flux change in the one direction; and wherein the first flip-flop is reset whenever either a said first or second output signal is provided.

2. A system according to claim 1, further comprising a data processor coupled to the second and third flip-flop for receiving said first and second output signals and for resetting both the second and third flip-flops following receipt of either a said first or second output signal.

3. A system according to claim 2, further comprising means for providing a data ready signal from the gate to the data processor whenever a said first or second output signal is provided.

4. A system according to claim 1, further comprising a data processor; and means for providing a data ready signal from the gate to the data processor whenever a said first or second output signal is provided;

wherein the data processor is coupled to the output of either the second or the third flip-flop for detecting the signal state at the coupled output upon receipt of the data ready signal and for resetting both second and third flip-flops following detection of said signal state.

5. A system for reproducing a recorded F2F binary information signal from a magnetic recording medium in which the signal was recorded by effecting alternating predetermined flux changes in the recording medium, wherein one binary state is represented by two consecutive flux changes that are separated by a first predetermined distance, and the opposite binary state is represented by three consecutive flux changes that are separated by a second predetermined distance that is approximately half the first predetermined distance, comprising means for receiving a said recording medium;

a leading sensor for sensing flux changes in the received recording medium;

a trailing sensor for sensing flux changes in the received recording medium, wherein the trailing sensor is separated from the leading sensor to sense said flux change after the leading sensor and the distance of separation between the trailing and leading sensor is less than said first predetermined distance and more than said second predetermined distance; and a logic circuit that is responsive to the flux changes in the recording medium being sensed by the leading and trailing sensors for reproducing said binary information signal, wherein the logic circuit comprises a first flip-flop connected to be continuously enabled and coupled to the leading sensor for being clocked in response to a said flux change being sensed by the leading sensor;

a second flip-flop coupled to the first flip-flop for being enabled in response to the first flip-flop being clocked and coupled to the leading sensor for being clocked in response to a said flux change subsequently being sensed by the leading sensor;

a third flip-flop coupled to the second flip-flop for being enabled in response to the second flip-flop being enabled and subsequently clocked, and coupled to the trailing sensor for being toggled in response to said flux changes subsequently being sensed by the trailing sensor;

a fourth flip-flop coupled to the second and third flip-flops for being enabled in response to the second flip-flop being enabled and subsequently clocked and the third flip-flop being either untoggled or toggled twice after being enabled, and coupled to the trailing sensor for being clocked in response to a said flux change subsequently being sensed by the trailing sensor;

a fifth flip-flop coupled to the second and third flip-flops for being enabled when the third flip-flops is not enabled except when the third flip-flop has been toggled only once after being enabled, and coupled to the trailing sensor for being clocked in response to a said flux change subsequently being sensed by the trailing sensor; and a gate coupled to the fourth and fifth flip-flop outputs for resetting the first and second flip-flops in response to either of the fourth and fifth flip-flops being enabled and subsequently clocked;

wherein a first output signal representing one binary state is provided from the fourth flip-flop output when, following the leading sensor sensing the first flux change occurring while the second and third flip-flops are not enabled, the leading sensor senses another flux change prior to the trailing sensor sensing a said flux change other than the second flux change sensed by the trailing sensor following said another flux change previously sensed by the leading sensor before the first flip-flop was reset; and a second output signal representing the opposite binary state is provided from the fifth flip-flop output when, following the leading sensor sensing the first flux change occurring while the second and third flip-flops are not enabled, and prior to the leading sensor sensing another said flux change, the trailing sensor senses a said flux change other than the second flux change sensed by the trailing sensor following said another flux change previously sensed by the leading sensor before the flip-flop was reset; and wherein the first and second flip-flops are both reset whenever either a said first or second output signal is provided.

6. A system according to claim 5, further comprising a data processor coupled to the fourth and fifth flip-flops for receiving said first and second output signals and for resetting both the fourth and fifth flip-flops following receipt of either a said first or second output signal.

7. A system according to claim 6 further comprising means for providing a data ready signal from the gate to the data processor whenever a said first or second output signal is provided.

8. A system according to claim 5, further comprising a data processor; and means for providing a data ready signal from the gate to the data processor whenever a said first or second output signal is provided;

wherein the data processor is coupled to the output of either the fourth or the fifth flip-flop for detecting the signal state at the coupled output upon receipt of the data ready signal and for resetting both fourth and fifth flip-flops following detection of said signal state.

9. A system for reproducing a recorded pulse width modulated binary information signal from a recording medium in which the signal was recorded by effecting alternating predetermined changes in the state of a given characteristic of the recording medium, with a state change in one direction representing a clock pulse and a state change in the opposite direction representing a data pulse, wherein the distance of separation between the state changes in the one direction is constant and the distance of separation from the state changes in the one direction to the state changes in the opposite direction is either a first predetermined distance to represent one binary state or a second predetermined that is less than the first predetermined distance to represent the opposite binary state, comprising means for receiving a said recording medium;

a leading sensor for sensing said given characteristic state changes in both directions in the received recording medium;

a trailing sensor for sensing said given characteristic state changes in the one direction in the received recording medium, wherein the trailing sensor is separated from the leading sensor to sense said state changes after the leading sensor and the distance of separation between the trailing and leading sensors is less than said first predetermined distance and more than said second predetermined distance; and a logic circuit that is responsive to the state changes in the recording medium being sensed by the leading and trailing sensors for reproducing said information binary signal, wherein the logic circuit comprises a first means coupled to the leading sensor for providing an enabling signal in response to a said state change in the one direction being sensed by the leading sensor;

a second means coupled to the first means for being enabled by said enabling signal; and coupled to the trailing sensor for providing a first output signal in response to a said state change in the one direction subsequently being sensed by the trailing sensor;

a third means coupled to the first means for being enabled by said enabling signal, and coupled to the leading sensor for providing a second output signal in response to a said state change in the opposite direction subsequently being sensed by the leading sensor; and a fourth means coupled to the second and third means for terminating the enabling signal from the first means in response to either of the second and third means being enabled and subsequently providing a said output signal;

wherein the first output signal is provided from the second means to represent the one binary state when, following the leading sensor sensing the first state change in the one direction occurring while the second and third means are not enabled the trailing sensor senses a state change in the one direction before the leading sensor senses a state change in the opposite direction; and the second output signal is provided from the third means to represent the opposite binary state when, following the leading sensor sensing the first state change in the one direction occurring while the second and third means are not enabled, the leading sensor senses a state change in the opposite direction before the trailing sensor senses a state change in the one direction; and wherein the enabling signal from the first means is terminated whenever either a said first or second output signal is provided.

10. A system according to claim 9, further comprising a data processor coupled to the second and third means for receiving said first and second output signals and for terminating said output signals from the second and third means following receipt of either a said first or second output signal.

11. A system according to claim 10, further comprising means for providing a data ready signal from the fourth means to the data processor whenever a said first or second output signal is provided.

12. A system according to claim 9, further comprising a data processor; and means for providing a data ready signal from the fourth means to the data processor whenever a said first or second output signal is provided;

wherein the data processor is coupled to the output of either the second or the third means for detecting the signal state at the coupled output upon receipt of the data ready signal and for resetting both second and third means following detection of said signal state.

13. A system for reproducing a recorded F2F binary information signal from a recording medium in which the signal was recorded by effecting alternating predetermined changes in the state of a given characteristic of the recording medium, wherein one binary state is represented by two consecutive characteristic state changes that are separated by a first predetermined distance, and the opposite binary state is represented by three consecutive characteristic state changes that are separated by a second predetermined distance that is approximately half the first predetermined distance, comprising means for receiving a said recording medium;

a leading sensor for sensing said given characteristic state changes in the received recording medium;

a trailing sensor for sensing said given characteristic state changes in the received recording medium, wherein the trailing sensor is separated from the leading sensor to sense said state changes after the leading sensor and the distance of separation between the trailing and leading sensor is less than the said first predetermined distance and more than said second predetermined distance; and a logic circuit that is responsive to the given characteristic state changes in the recording medium being sensed by the leading and trailing sensors for reproducing said binary information signal, wherein the logic circuit comprises;

a first means coupled to the leading sensor for providing a first enabling signal in response to a said state change being sensed by the leading sensor;

a second means coupled to the first means for being enabled by said first enabling signal and coupled to the leading sensor for providing a second enabling signal in response to a said state change subsequently being sensed by the leading sensor;

a third means coupled to the second means for being enabled by said second enabling signal and coupled to the trailing sensor for being toggled to provide first an inhibiting signal and then a third enabling signal in response to a said state change subsequently being sensed by the trailing sensor;

a fourth means coupled to the second and third means for being enabled in response to the second means providing said second enabling signal and the third means being either untoggled or toggled twice after being enabled to provide said third enabling signal, and coupled to the trailing sensor for providing a first output signal in response to a said state change subsequently being sensed by the trailing sensor;

a fifth means coupled to the second and third means for being enabled when the third means is not enabled except when the third means has been toggled only once after being enabled, and coupled to the trailing sensor for providing a first output signal in response to a said state change subsequently being sensed by the trailing sensor; and a sixth means coupled to the fourth and fifth means outputs for terminating the first and second enabling signals from the first and second means in response to either of the fourth and fifth means being enabled and subsequently providing a said output signal;

wherein the first output signal representing the opposite binary state is provided from the fourth means when, following the leading sensor sensing the first said characteristic state change occurring while the second and third means are not enabled, the leading sensor senses another said state change prior to the trailing sensor sensing a said state change other than the second said state change sensed by the trailing sensor following said another state change previously sensed by the leading sensor before the first enabling signal was terminated; and the second output signal representing the one binary state is provided from the fifth means when, following the leading sensor sensing the first said characteristic state change occurring while the second and third means are not enabled, and prior to the leading sensor sensing another said state change, the trailing sensor senses a said state change other than the second state change sensed by the trailing sensor following said another state change previously sensed by the leading sensor before the first enabling signal was terminated; and wherein both the first and second enabling signals are terminated whenever either a said first or second output signal is provided.

14. A system according to claim 13, further comprising a data processor coupled to the fourth and fifth means for receiving said first and second output signals and for terminating said output signals from the fourth and fifth means following receipt of either a said first or second output signal.

15. A system according to claim 14, further comprising means for providing a data ready signal from the sixth means to the data processor whenever a said first or second output signal is provided.

16. A system according to claim 13, further comprising a data processor, and means for providing a data ready signal from the sixth means to the data processor whenever a said first or second output signal is provided;

wherein the data processor is coupled to the output of either the fourth or the fifth means for detecting the signal state at the coupled output upon receipt of the data ready signal and for resetting both fourth and fifth means following detection of said signal state.

* * * * *